Patented May 22, 1951

2,553,564

UNITED STATES PATENT OFFICE 2,553,564

ESTERS OF HYDRACRYLIC ACID AND IMINO ETHERS

Martin L. Fein, Riverside, N. J., and Charles H. Fisher, Abington, Pa., assignors to United States of America as represented by the Secretary of Agriculture No Drawing. Application April 16, 1948, Serial No. 21,544

16 Claims. (Cl. 260—453)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to esters of hydracrylic acid and has for an object the provision of such esters and processes for their preparation.

We have found that esters of hydracrylic acid are obtained on reacting an alcohol with ethylene cyanohydrin and hydrogen chloride, and hydrolyzing the resulting iminoether hydrochloride. This reaction is illustrated by the following equations wherein R represents a hydrocarbon radical free of substituents other than halogen:

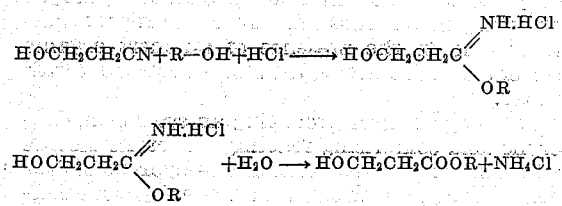

According to the method of this invention, the alcohol is reacted with ethylene cyanohydrin and anhydrous hydrogen chloride, under substantially anhydrous conditions, and preferably in the presence of an inert solvent, and the reaction products are then hydrolyzed by an addition of water. The hydracrylic acid ester thus obtained is then recovered from the reaction mixture by any suitable means, as for example, by solvent extraction and distillation.

The process of our invention is applicable to the production of esters of hydracrylic acid in general. Alcohols which can be reacted with ethylene cyanohydrin and hydrogen chloride under the conditions of the reaction to yield the corresponding ester of hydracrylic acid include, for example, methyl, ethyl, propyl, butyl, octyl and higher saturated aliphatic alcohols containing a normal or branched carbon atom chain; allyl alcohol, beta-chloroallyl and other chloroallyl alcohols, and other unsaturated aliphatic alcohols, such as oleyl alcohol. Aromatic, alicyclic and heterocyclic alcohols such as benzyl alcohol, cyclohexanol and tetrahydrofurfuryl alcohol may also be used.

The following examples are illustrative of the invention:

Example I

Dry hydrogen chloride was bubbled at about 0 to 10° C. into a solution of 142 g. beta-hydroxypropionitrile (ethylene cyanohydrin) and 296 g. n-butyl alcohol in 200 ml. of diethyl ether, until the solution became saturated, which required approximately five hours. On standing for about 48 hours at 0 to 5° C., a columinous, white, crystalline precipitate (beta-hydroxypropionimino butyl ether hydrochloride) was formed. Most of the free hydrogen chloride was then removed from the reaction mixture by alternately applying vacuum and blowing a stream of dry air through the slurry. Approximately 200 ml. benzene was then added, followed by about 150 ml. of water, which was added gradually by increments, until the solid material was dissolved and hydrolyzed. The aqueous layer was separated from the supernatant benzene solution and extracted with a small amount of fresh benzene. The extract was added to the benzene solution and was then washed with water and aqueous sodium chloride solution to remove free acidity, and distilled under reduced pressure. Butyl hydracrylate was collected at approximately 69° C./0.5 mm.

Example II

A mixture of 142 g. ethylene cyanohydrin, 240 g. n-propyl alcohol and 200 ml. diethyl ether was saturated with dry hydrogen chloride and the reaction products (including the formed beta-hydroxypropionimino propyl ether hydrochloride) treated as described in the foregoing example. n-Propyl hydracrylate distilled at approximately 74° C./4.6 mm.

Example III

Dry hydrogen chloride was bubbled into 200 ml. diethyl ether at 10° to 20° C. until approximately 80 g. of HCl were absorbed. 240 g. of n-propanol were then added and 142 g. ethylene cyanohydrin stirred into the mixture while maintaining the temperature at 10° to 20° C. When all of the ethylene cyanohydrin had been added the mixture was allowed to warm up to room temperature, whereupon a white solid material (beta-hydroxypropionimino propyl ether hydrochloride) began to separate and the temperature of the reaction mixture rose to about 40° C. On standing at room temperature for several days the contents of the flask solidified to a white crystalline mass. Free hydrogen chloride was then removed as described in Example I, 300 ml. benzene were then added and the reaction product hydrolyzed with approximately 100 ml. of water, which was added gradually until all the solid material was dissolved and hydrolyzed. The benzene layer was separated and treated with powdered sodium bicarbonate to neutralize free acidity. The benzene solution was then distilled first at atmospheric pressure to remove benzene, water, and excess alcohol, and then under vacuum to recover propyl hydracrylate which was collected at about 61° C./1.7 mm.

*Example IV*

Ethyl hydracrylate was obtained by the procedure of Example III using an equivalent amount of ethanol instead of n-propanol, the imino ether formed herein being beta-hydroxypropionimino ethyl ether hydrochloride.

*Example V* n-Octyl hydracrylate was obtained by saturating a mixture of 400 g. n-octyl alcohol, 142 g. ethylene cyanohydrin and 200 ml. diethyl ether with dry hydrogen chloride and treating the reaction products (including the formed beta-hydroxypropionimino octyl ether hydrochloride) as described in Example I. n-Octyl hydracrylate distilled at approximately 115° C./0.8 mm.

On re-distillation under reduced pressure the alkyl hydracrylates of the foregoing examples had the following characteristics:

| | Boiling point °C. at 10 mm. of Hg | $N_D^{20}$ | $d_4^{20}$ |
|---|---|---|---|
| Ethyl hydracrylate | 76 | 1.4222 | 1.0589 |
| n-Propyl hydracrylate | 89 | 1.4263 | 1.0243 |
| n-Butyl hydracrylate | 101 | 1.4292 | 1.0006 |
| n-Octyl hydracrylate | 150 | 1.4405 | 0.9488 |

*Example VI*

A mixture of 142 g. ethylene cyanohydrin, 375 g. beta-chloroallyl alcohol and 200 ml. diethyl ether was saturated with dry hydrogen chloride as described in Example I. No solid reaction product was formed even on maintaining the reaction mixture at about 0 to 5° C. for one week. Excess hydrogen chloride was then removed by the previously described procedure and the viscous reaction mixture was thoroughly stirred with 300 ml. of benzene. About 400 ml. of water were then added gradually, while cooling the mixture so as to keep the temperature below 50° C. A large amount of a white crystalline precipitate (beta-hydroxypropionimino beta-chloroallyl ether hydrochloride) was formed. Addition of water was continued until the precipitate was dissolved, the benzene layer was separated and washed successively with dilute aqueous solutions of sodium bicarbonate and sodium carbonate to neutralize free acidity. The benzene solution was then distilled first at atmospheric pressure to remove benzene, water and the unreacted chloroallyl alcohol and then under reduced pressure to recover the beta-chloroallyl hydracrylate which was collected at about 83° C./1 mm and had an index of refraction ($N_D^{20}$) of 1.4680.

*Example VII*

Allyl hydracrylate was obtained by an analogous procedure of Example VI using an equivalent amount of allyl alcohol, the imino ether formed herein being beta-hydroxypropionimino allyl ether hydrochloride.

Although in the foregoing examples the process was conducted in the presence of diethyl ether as a diluent, and benzene was utilized as a solvent for the esters of hydracrylic acid, other organic solvents which are inert toward the reactants and reaction products may be utilized as solvents and diluents. Diethyl ether may be replaced, for example, by ethyl propyl ether, dipropyl ether, toluene, and ethylene dichloride, and other entrainers can be used in place of benzene.

Having thus described our invention, we claim:

1. A process comprising reacting an alcohol with ethylene cyanohydrin and hydrogen chloride under substantially anhydrous conditions, contacting the resulting product with water to produce an ester of hydracrylic acid corresponding to the alcohol used as the reactant, and recovering the formed ester of hydracrylic acid.

2. A process comprising reacting an alcohol of the formula ROH, wherein R represents a hydrocarbon radical free of substituents other than halogen, with ethylene cyanohydrin and hydrogen chloride under substantially anhydrous conditions to form the imino-ether hydrochloride corresponding to the formula

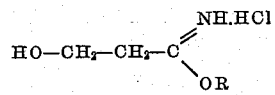

wherein R has the same significance as above, and hydrolyzing said imino-ether hydrochloride to the ester of hydracyclic acid having the formula

wherein R has the same significance as above.

3. The process of producing an ester of hydracrylic acid comprising reacting an alcohol with ethylene cyanohydrin and anhydrous hydrogen chloride, under substantially anhydrous conditions, and in the presence of an inert organic solvent, and contacting the resulting product with water.

4. The process of producing an ester of hydracrylic acid comprising reacting an acrylic alcohol with ethylene cyanohydrin and anhydrous hydrogen chloride, under substantially anhydrous conditions, and in the presence of an inert organic solvent, and contacting the resulting product with water.

5. The process of claim 4 wherein the alcohol is a saturated alcohol.

6. The process of claim 4 wherein the alcohol is a monounsaturated olefinic alcohol.

7. The process of claim 4 wherein the alcohol is a chloroallyl alcohol.

8. The process of claim 4 wherein the alcohol is beta-chloroallyl alcohol.

9. The process of claim 4 wherein the alcohol is n-butyl alcohol.

10. The process of claim 4 wherein the alcohol is n-octyl alcohol.

11. Beta-chloroallyl hydracrylate.

12. An imino-ether hydrochloride corresponding to the general formula:

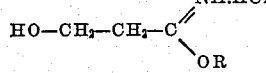

wherein R represents a hydrocarbon radical free of substituents other than halogen.

13. A process comprising reacting an alcohol of the formula ROH, wherein R represents a hydrocarbon radical free of substituents other than halogen, with ethylene cyanohydrin and hydrogen chloride under substantially anhydrous conditions to form the imino-ether hydrochloride corresponding to the formula

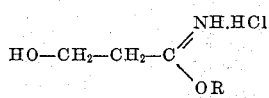

wherein R has the same significance as above.

14. The process of claim 13 wherein R is an unsaturated aliphatic radical.

15. The process of claim 13 where R is the beta-chloroallyl radical.

16. The imino-ether hydrochloride of claim 12 wherein R is the beta-chloroallyl radical.

MARTIN L. FEIN.
CHARLES H. FISHER.

REFERENCES CITED

The following references are of record in the file of this patent:

UNITED STATES PATENTS

| Number | Name | Date |
|---|---|---|
| 1,650,950 | Matheson | Nov. 29, 1927 |
| 2,122,716 | Graves | July 5, 1938 |

FOREIGN PATENTS

| Number | Country | Date |
|---|---|---|
| 341,961 | Great Britain | Jan. 26, 1931 |

OTHER REFERENCES

McElvain et al., J. Am. Chem. Soc., vol. 64, pp. 1825–1827 (Aug. 1942).

Drushel, Am. Jour. Sci., vol. 40, pages 511–514 (1915).

Karrer, Organic Chemistry, 2nd ed., 1946, page 211.